United States Patent
Kamimura

(10) Patent No.: US 12,165,428 B2
(45) Date of Patent: *Dec. 10, 2024

(54) HUMAN BODY DETECTION PROCESSING APPARATUS, METHOD AND NON-TRANSITORY COMPUTER-READABLE RECORDING MEDIUM

(71) Applicant: NEC Corporation, Tokyo (JP)

(72) Inventor: Junichi Kamimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/638,343

(22) PCT Filed: Mar. 30, 2021

(86) PCT No.: PCT/JP2021/013608
§ 371 (c)(1),
(2) Date: Feb. 25, 2022

(87) PCT Pub. No.: WO2022/208669
PCT Pub. Date: Oct. 6, 2022

(65) Prior Publication Data
US 2024/0054805 A1    Feb. 15, 2024

(51) Int. Cl.
G06V 40/10    (2022.01)
G06T 7/60    (2017.01)
G06V 10/74    (2022.01)

(52) U.S. Cl.
CPC .............. *G06V 40/103* (2022.01); *G06T 7/60* (2013.01); *G06V 10/761* (2022.01)

(58) Field of Classification Search
CPC .... G06V 40/103; G06V 10/761; G06V 10/82; G06V 40/10; G06T 7/60; G06T 7/00
See application file for complete search history.

(56) References Cited

U.S. PATENT DOCUMENTS

2013/0259307 A1* 10/2013 Torii ................ G06V 40/103
                                                         382/103
2021/0125639 A1*  4/2021 Cai ................. G06V 40/10
2022/0414918 A1* 12/2022 Ogawa .............. G06V 10/761

FOREIGN PATENT DOCUMENTS

JP    2011-130328 A    6/2011
JP    2014-093715 A    5/2014
(Continued)

OTHER PUBLICATIONS

WO 2020261362 (English Machine Translated, Ogawa, Published Dec. 30, 2020) (Year: 2020).*
(Continued)

Primary Examiner — Juan M Guillermety
(74) Attorney, Agent, or Firm — Sughrue Mion, PLLC

(57) ABSTRACT

A portion rectangle estimation unit estimates a specific portion of a human body from an image, and outputs a first portion rectangle. A first human body rectangle estimation unit estimates the human body corresponding to the specific portion in the first portion rectangle based on coordinates of the first portion rectangle, and outputs a first human body rectangle. A second human body rectangle estimation unit estimates the human body from the image, and outputs a second human body rectangle. A second portion rectangle estimation unit estimates the specific portion corresponding to the human body in the second human body rectangle based on coordinates of the second human body rectangle, and outputs a second portion rectangle. A human body integration unit integrates duplicate human rectangles based on at least a relationship between the portion rectangles with respect to a plurality of pairs of mutually corresponding portion rectangles and human body rectangles.

14 Claims, 13 Drawing Sheets

(56) References Cited

FOREIGN PATENT DOCUMENTS

JP    2018-088049 A    6/2018
JP    2018-106282 A    7/2018

OTHER PUBLICATIONS

International Search Report for PCT Application No. PCT/JP2021/013608, mailed on Jun. 29, 2021.
Shaoqing Ren et al., "Faster r-cnn: Towards real-time object detection with region proposal networks", IEEE Trans Pattern Anal Mach Intell. Jun. 2017;39(6):1137-1149. doi: 10.1109/TPAMI.2016.2577031. Epub Jun. 6, 2016, pp. 1-9.

\* cited by examiner

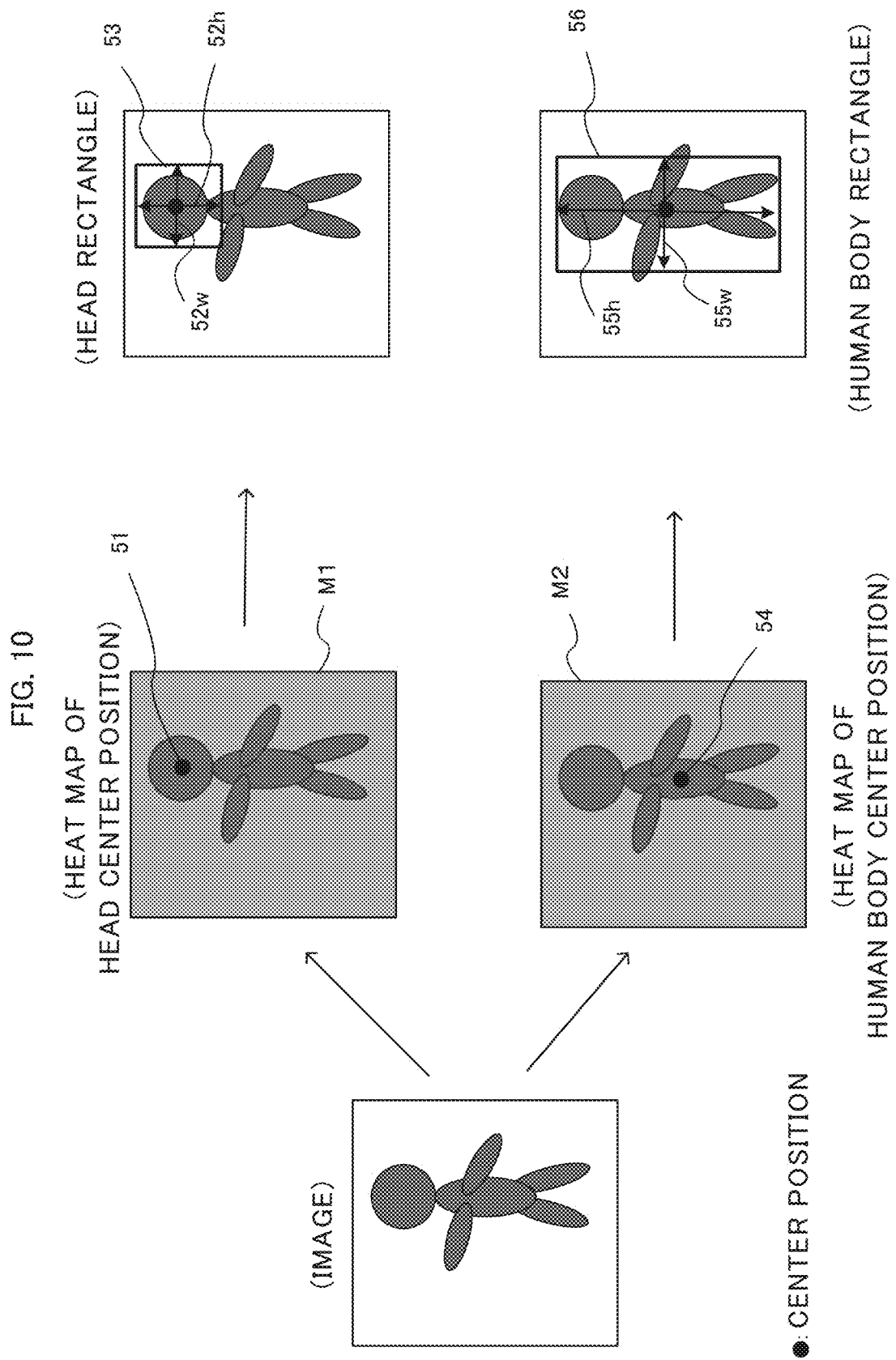

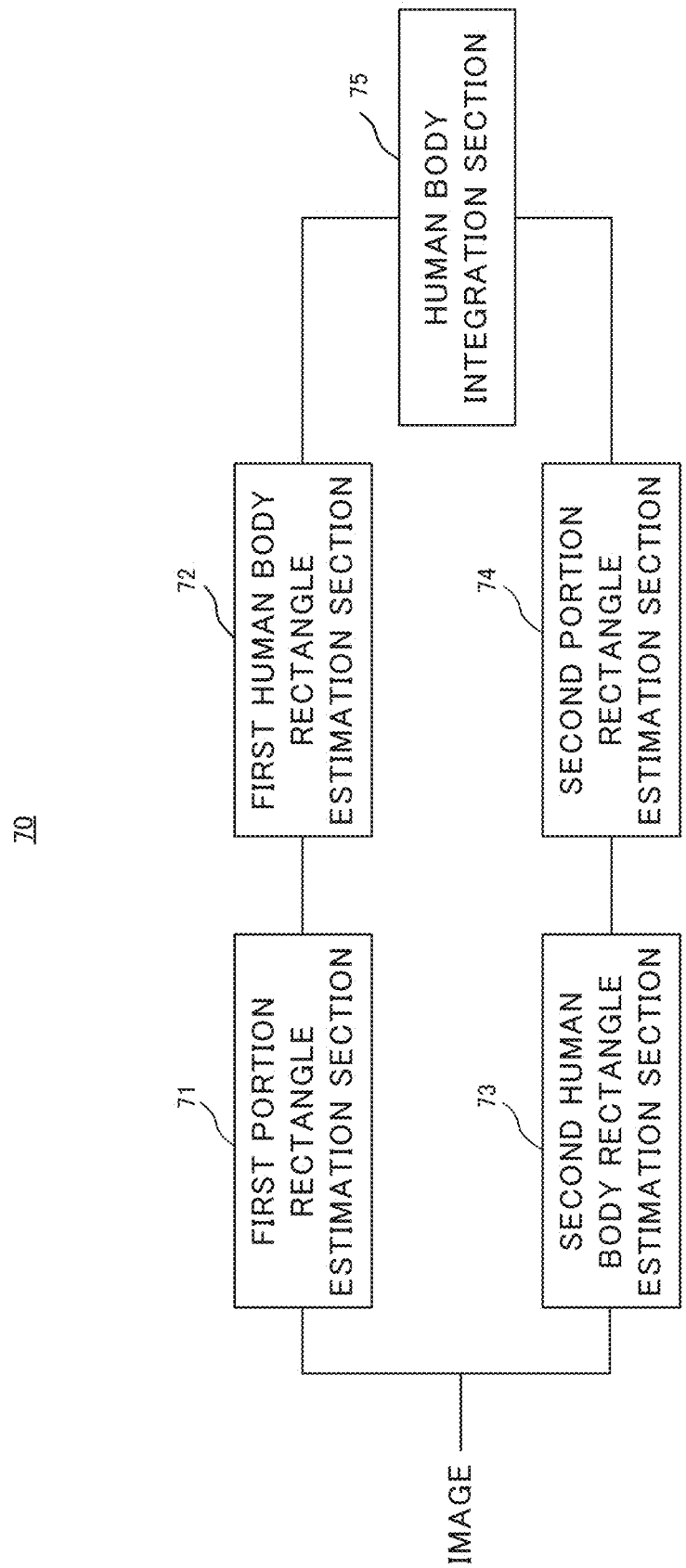

HUMAN BODY DETECTION PROCESSING APPARATUS, METHOD AND NON-TRANSITORY COMPUTER-READABLE RECORDING MEDIUM

This application is a National Stage Entry of PCT/JP2021/013608 filed on Mar. 30, 2021, the contents of all of which are incorporated herein by reference, in their entirety.

TECHNICAL FIELD

This disclosure relates to a technique for detecting a human body from an image.

BACKGROUND ART

Recently, many object detection techniques for a neural network (Neural Network) using deep learning have been proposed. An object detection is to estimate what an object captured in an image or a video is and to obtain, at the same time, a circumscribed rectangle of the object called a "bounding box", so as to estimate a position and a size of the object. Hence, an object detector outputs position coordinates of the bounding box of the object, a category of the object, and a degree of reliability indicating a probability that the object is in that category.

An example of an object detection device is described in Non-Patent Document 1. This document discloses a discriminator that outputs a bounding box position of an object candidate position from within the image and a degree of reliability expressing a probability of an object, and a discriminator that outputs the bounding box position from the object candidate position acquired above, a category of the object, and a degree of reliability with respect to the category.

In a field of an object detection, a human body detection is one of the most important tasks. The human body detection from a video image can be considered to apply various applications such as an automatic operation, a security monitoring, and a biometric authentication. Especially in a real world, a problem of shielding such as overlapping of people and partial hiding of a body by obstacles can be assumed in a crowded environment, and a robust human body detection is required for the shielding. Patent Document 1 describes a method for calculating a distance between a face region and a human body region which are detected from an image, and deleting the human body region as inappropriate when the face region and the human body region are in an unlikely situation.

PRECEDING TECHNICAL REFERENCES

Patent Document

[Patent Document 1] Japanese Patent Application Laid-open No. 2018-088049

Non-Patent Document

[Non-Patent Document 1] Ren, Shaoqing, et al. "Faster r-cnn: Towards real-time object detection with region proposal networks". Adbances in neural information processing systems, 2015.

SUMMARY

Problem to be Solved

It is one object of the present disclosure to improve technologies disclosed in the preceding technical references.

Means for Solving the Problem

According to an example aspect of the present disclosure, there is provided an information processing apparatus including:
a portion rectangle estimation unit configured to estimate a specific portion of a human body from an image, and output a first portion rectangle including the specific portion;
a first human body rectangle estimation unit configured to estimate a human body corresponding to the specific portion included in the first portion rectangle based on coordinates of the first portion rectangle, and output a first human body rectangle including the human body;
a second human body rectangle estimation unit configured to estimate the human body from the image, and output a second human body rectangle including the human body;
a second portion rectangle estimation unit configured to estimate the specific portion corresponding to the human body included in the second human body rectangle based on coordinates of the second human body rectangle, and output a second portion rectangle including the specific portion; and
a human body integration unit configured to integrate duplicate human rectangles based on at least a relationship between the portion rectangles with respect to a plurality of pairs of mutually corresponding portion rectangles and human body rectangles.

According to another example aspect of the present disclosure, there is provided an information processing method including:
estimating a specific portion of a human body from an image, and outputting a first portion rectangle including the specific portion;
estimating the human body corresponding to the specific portion included in the first portion rectangle based on coordinates of the first portion rectangle, and outputting a first human body rectangle including the human body;
estimating the human body from the image, and outputting a second human body rectangle including the human body;
estimating the specific portion corresponding to the human body included in the second human body rectangle based on coordinates of the second human body rectangle, and outputting a second portion rectangle including the specific portion; and
integrating duplicate human rectangles based on at least a relationship between the portion rectangles with respect to a plurality of pairs of mutually corresponding portion rectangles and human body rectangles.

According to still another example aspect of the present disclosure, there is provided a recording medium storing a program, the program causing a computer to perform a process including:
estimating a specific portion of a human body from an image, and outputting a first portion rectangle including the specific portion;
estimating a human body corresponding to the specific portion included in the first portion rectangle based on coordinates of the first portion rectangle, and outputting a first human body rectangle including the human body;

estimating the human body from the image, and outputting a second human body rectangle including the human body;

estimating the specific portion corresponding to the human body included in the second human body rectangle based on coordinates of the second human body rectangle, and outputting a second portion rectangle including the specific portion; and integrating duplicate human rectangles based on at least a relationship between the portion rectangles with respect to a plurality of pairs of mutually corresponding portion rectangles and human body rectangles.

BRIEF DESCRIPTION OF THE DRAWINGS

FIG. 10 is a diagram for explaining a detection method of a head rectangle and a human body rectangle by using an object detection method of an anchor-free base.

FIG. 13A and FIG. 12B illustrate display examples of a recognition result acquired by the recognition apparatus.

FIG. 14 is a block diagram illustrating a configuration of a human body detection apparatus of a second example embodiment.

EXAMPLE EMBODIMENTS

Figure 1:
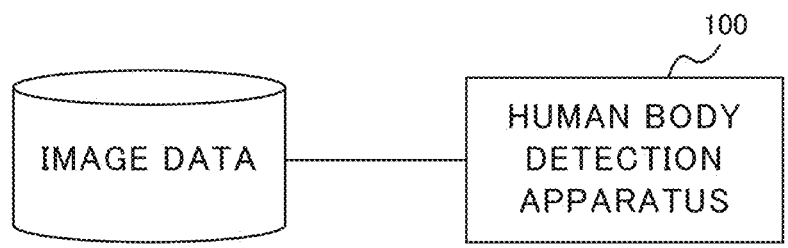
FIG. 1 illustrates a human body detection apparatus according to a first example embodiment.

In the following, example embodiments of the present disclosure will be described with reference to the accompanying drawings.
<Basic Principles>

There is a problem that a human body cannot be detected with high accuracy when an object to be detected is shielded. In this case, two cases are considered as shielding. One is an overlap between different categories. For instance, a situation is considered in which a pedestrian is shielded with an obstacle such as a wall and a car and a part of a body of the pedestrian cannot be seen. In this case, since a visible area of a human body becomes small and a lack of information occurs, it is difficult to estimate a bounding box position for the whole human body.

One of the problems that the shielding brings in an object detection is that it is difficult to directly estimate an entire object where the shielding is occurred from the image. Therefore, among portions depending on an object to be detected, a portion in which the shielding is unlikely to occur is estimated first, and an estimation of the object to be detected in a periphery of the portion alone is performed. For instance, in a case of the human body, a head corresponds to that portion. Since a surveillance camera and a vehicle-mounted camera in a real world is often installed at a high position, the head tends to be relatively difficult to be shielded. Therefore, in the present example embodiment, first, a head region is estimated, and the human body region is estimated at a peripheral portion, thereby enabling detection of an object of interest even in an environment where there are a lot of shielded portions.

Another problem is an overlap between objects of the same category. For instance, in a crowded state such as a public facility or an event venue, people overlap each other, and it becomes difficult to estimate a bounding box position of the whole body due to the shielding. Also, in the object detection, when an estimation result of a plurality of bounding boxes is obtained for the same object in the image, it is done to integrate these bounding boxes into one by a technique called an NMS (Non-Maximum Suppression). However, in a crowded environment, an overlap between people is large, and rectangles, in which different persons are estimated, are integrated into one by the NMS.

To solve these problems, in the present example embodiments, rectangle position information of a head is used in an integration process. Specifically, an integration process is performed with emphasis on an overlap between heads. This actually prevents individual persons from being integrated into a single person by the integration process.

Incidentally, as a problem in a case of performing the integration process using the head, accuracy of estimating a human body from a head is low. In a case where the shielding of the human body is large and only the head is visible, accuracy of estimating a rectangle of the human body from a rectangle of the head is lower than accuracy of estimating the rectangle of the human body in a case where the whole of the human body is visible without the shielding. That is, accuracy originally differs between a rectangle of the human body obtained by estimating the human body from the image (hereinafter, also referred to as a "human body rectangle derived from the human body") and a rectangle of the human body obtained by estimating a head rectangle and estimating the human body from the estimated head rectangle (hereinafter, referred to as a "human body rectangle derived from the head"). Accordingly, in a case where many human body rectangles derived from the head remain due to the integration process, accuracy of the entire detector is reduced. Hence, in the following example embodiments, the integration process is performed so as to remain the human body rectangle derived from the human body more proactively than the human body rectangle derived from the head. By this integration process, it is possible to prevent a decrease in the accuracy of the entire detector. In the above description, the head is used as an example of a part of the human body where the shielding is unlikely to occur; however, a specific part of the human body other than the head may be used.

First Example Embodiment

[Human Body Detection Apparatus]

FIG. 1 illustrates a human body detection apparatus according to a first example embodiment. The human body detection apparatus 100 detects a human body from input image data. Details will be described later, and the human body detection apparatus 100 can distinguishably detect a human body obtained by estimating the human body from a human body rectangle (hereinafter, also referred to as a "human body derived from the human body") and a human body obtained by estimating a head rectangle and estimating the human body from the estimated head rectangle (hereinafter, referred to as a "human body derived from a head").

[Hardware Configuration]

Figure 2:
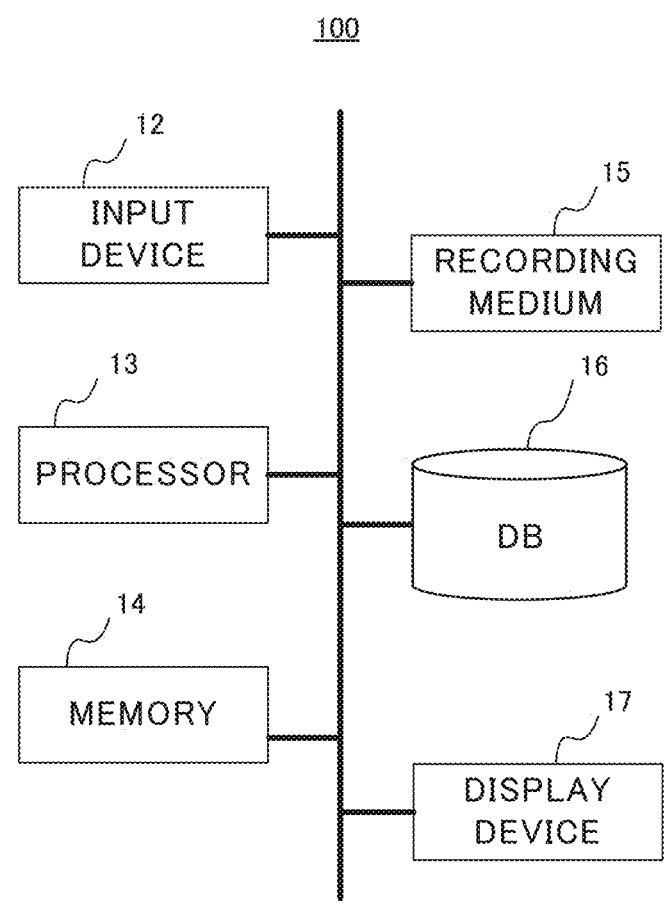
FIG. 2 is a block diagram illustrating a hardware configuration of the human body detection apparatus according to the first example embodiment.

FIG. 2 is a block diagram illustrating a hardware configuration of the human body detection apparatus according to the first example embodiment. As shown, the human body detection apparatus 100 includes an input device 12, a processor 13, a memory 14, a recording medium 15, a database (DB) 16, and a display device 17.

The input device 12 inputs image data to be used for learning or inferring by the human body detection apparatus 100. The image data may be a video or a still image. As the input device 12, for instance, a digital camera, a smartphone with a camera, a vehicle-mounted camera, or the like may be used. The input device 12 may acquire the image data stored in a server or the like through a communication.

The processor 13 is a computer such as a CPU (Central Processing Unit) and controls the entire human body detection apparatus 100 by executing a program prepared in advance. Incidentally, the processor 13 may be a GPU (Graphics Processing Unit) or a FPGA (Field-Programmable Gate Array). Specifically, the processor 13 executes a human body detection process described later.

The memory 14 is formed by a ROM (Read Only Memory), a RAM (Random Access Memory), or the like. The memory 14 stores various programs to be executed by the processor 13. The memory 14 is also used as a work memory during executions of various processes by the processor 13.

The recording medium 15 is a non-volatile and non-transitory recording medium such as a disk-shaped recording medium or a semiconductor memory, and is configured to be detachable from the human body detection apparatus 100. The recording medium 15 records various programs executed by the processor 13. When the human body detection apparatus 100 executes various processes, programs recorded on the recording medium 15 are loaded into the memory 14 and executed by the processor 13.

The DB 16 stores image data input from an external apparatus including the input device 12. Specifically, the image data used for learning of the human body detection apparatus 100 are stored in the DB 16. The display unit 17 is, for instance, a liquid crystal display device or a projector, and displays a detection result by the human body detection apparatus 100. In addition to the above, the human body detection apparatus 100 may include input equipment such as a keyboard or a mouse for the user to perform instructions or inputs.

[Function Configuration]

Figure 3:
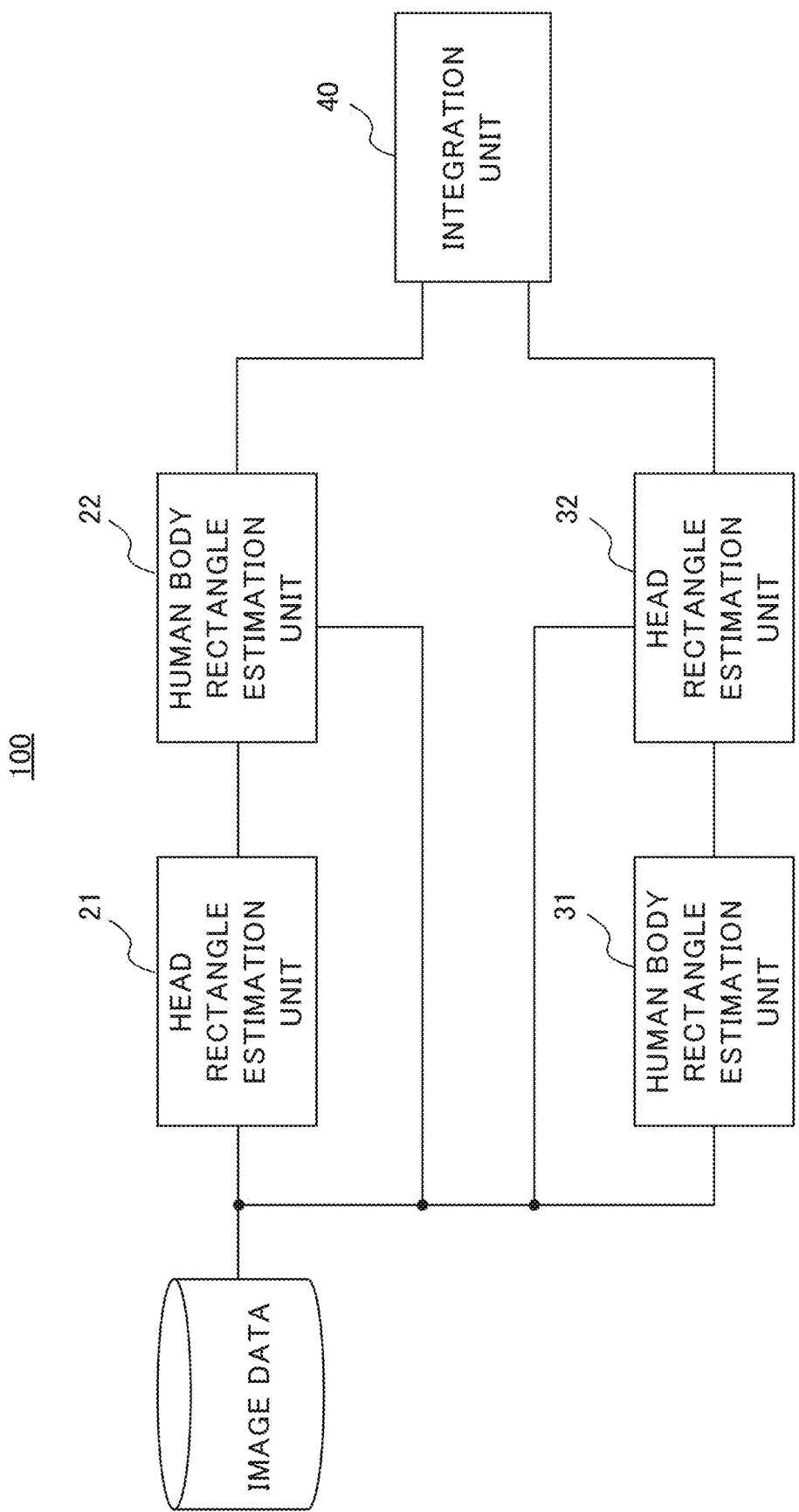
FIG. 3 is a block diagram illustrating a functional configuration of the human body detection apparatus according to the first example embodiment.

FIG. 3 is a block diagram illustrating a functional configuration of the human body detection apparatus 100 according to the first example embodiment. The human body detection apparatus 100 functionally includes a head rectangle estimation unit 21, a human body rectangle estimation unit 22, a human body rectangle estimation unit 31, and a head rectangle estimation unit 32.

(Entire Process)

The image data are input to each of the head rectangle estimation unit 21, the human body rectangle estimation unit 22, the human body rectangle estimation unit 31, and the head rectangle estimation unit 32. The image data are input from the input device 12 and may be a color image or a gray scale image. Any image size is also acceptable.

The head rectangle estimation unit 21 receives the image data, calculates an image feature amount, estimates a head, and calculates coordinates (hereinafter, referred to as "head rectangle coordinates") of a bounding box (referred to as "rectangle") of the head and reliability (hereinafter, referred to as "head reliability") expressing a head likelihood. Incidentally, head rectangle coordinates and a head reliability are collectively referred to as "head rectangle information."

The human body rectangle estimation unit 22 estimates a human body rectangle indicating a human body corresponding to the head based on the image data and the head rectangle information output by the head rectangle estimation unit 21, and calculates coordinates of the human body rectangle (hereinafter, referred to as "human body rectangle coordinates") and a reliability representing a human body likelihood (hereinafter, referred to as "human body reliability"). Incidentally, the human body rectangle coordinates and the human body reliability are collectively referred to as "human body rectangle information".

Accordingly, from the image data, a pair of the head rectangle and the human body rectangle (hereinafter, referred to as a "pair of a head and a human body") is generated and sent an integration unit 40. The pair of the head and the human body, which is generated by the head rectangle estimation unit 21 and the human body rectangle estimation unit 22, is also referred to as a "pair of a head and a human body derived from the head". The human body rectangle estimation unit 22 outputs a number of pairs of a head and human body derived from the head, which can be estimated from the image data, to the integration unit 40.

On the other hand, the human body rectangle estimation unit 31 receives the image data, calculates an image feature amount, estimates a human body, and outputs human body rectangle information including human body rectangle coordinates and a human body reliability. The head rectangle estimation unit 32 estimates a head rectangle indicating a head corresponding to the human body based on the image data and the human body rectangle information output by the human body rectangle estimation unit 31, and calculates head rectangle information including head rectangle coordinates and head reliability. Accordingly, a pair of a head and a human body is generated from the image data and sent to the integration unit 40. Incidentally, the pair of the head and the human body generated by the human body rectangle estimation unit 31 and the head rectangle estimation unit 32 is also referred to as a "pair of a head and a human body derived from the human body". The head rectangle estimation unit 32 outputs a number of pairs of heads and human bodies derived from the human bodies which are estimated from the image data, to the integration unit 40.

The integration unit 40 performs an integration process for a plurality of pairs of heads and human bodies, which include pairs of heads and human bodies derived from the heads input from the human body rectangle estimation unit 22 and pairs of heads and human bodies derived from the human bodies input from the head rectangle estimation unit 32. Specifically, for a plurality of input pairs of heads and human bodies, the integration unit 40 deletes a duplicate pair of a head and a human body based on a relationship between head rectangles or a relationship between the head rectangles and a relationship between human body rectangles. In this case, the integration unit 40 performs an integration process so as to preferentially retain the pairs of heads and human bodies derived from the human bodies over the pairs of heads and human bodies derived from the head, and details thereof will be described later. Accordingly, duplicate human body rectangles detected for the same person are integrated, and human body rectangles corresponding to different persons are retained. The integration unit 40 outputs the human body rectangle information of the retained human body rectangle.

The head rectangle estimated by the head rectangle estimation unit 21 is an example of a first portion rectangle, the human body rectangle estimated by the human body rectangle estimation unit 22 is an example of a first human body rectangle, the human body rectangle estimated by the human body rectangle estimation unit 31 is an example of a second human body rectangle, and the head rectangle estimated by the head rectangle estimation unit 32 is an example of a second portion rectangle.

(Generation of a Pair of a Head and a Human Body Derived from the Head)

Next, a method for generating a pair of a head and a human body derived from the head by the head rectangle estimation unit 21 and the human body rectangle estimation unit 22 will be described.

(1) First Method

In the first method, the head rectangle estimation unit 21 outputs head rectangle information by estimating a head from image data, and the human body rectangle estimation unit 22 generates human body rectangle information from the image data and the head rectangle information.

Estimation of a head rectangle by the head rectangle estimation unit 21 is not limited to a specific estimation process; for instance, a matching method using a sliding window or a method using machine learning such as deep learning can be used.

Figure 4:
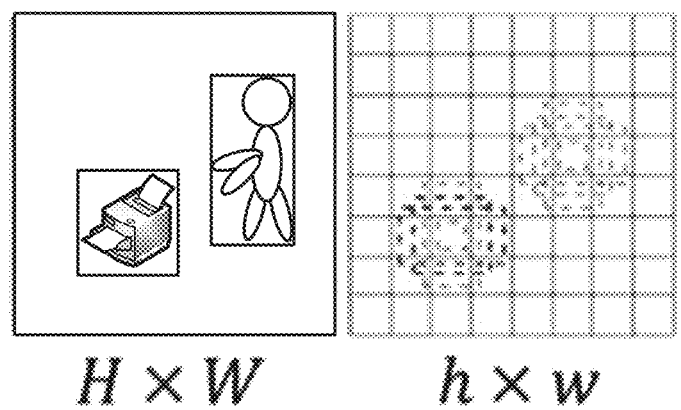
FIG. 4 illustrates examples of an image feature amount and an anchor box.

In the following, an example using the machine learning will be described. First, the head rectangle estimation unit 21 extracts an image feature amount using a neural network. Examples of neural networks include VGGs and ResNet. The image input to the neural network is reduced by a plurality of convolution processes, and the image feature amount is generated in the process. The image feature amount is information of three dimensions. FIG. 4 illustrates examples of an image feature amount and an anchor box. Now, it is assumed that a size of the image feature amount, which is generated when an image having an image size of H×W is input, is defined as h×w×c. Here, "h" and "w" denote vertical and horizontal sizes as the image feature amount, and "c" denotes the number of classes. The head rectangle estimation unit 21 performs a position estimation of the head rectangle using the extracted image feature amount and the anchor box. The anchor box is a rectangle group of predefined aspect ratios and numbers, and anchor boxes are innumerably scattered in the image. Actually, the defined number of anchor boxes are arranged at each point in a spatial direction of the image feature amount. A spatial size of the image feature amount is h×w for a size of h×w×c. In a case where four anchor boxes are arranged at each point, a total of h×w×4 anchor boxes are arranged.

Next, the head rectangle estimation unit 21 outputs head rectangle coordinates and head reliability by using the image features for each anchor box. The image feature for each anchor box is an information amount of 1×1×c where the anchor box is located. The convolution process is conducted again for the information amount of 1×1×c, and the estimation of the head rectangle coordinates and the estimation of the head reliability are performed. The estimation at this time becomes possible by a rectangle position regression and by that a neural network learns category classification. Specifically, a position and a category of a head are given as correct answer data, an error of an estimated result with respect to the correct answer data is calculated by a loss function, and a correction of the neural network is performed in order to make the error smaller. This process is repeated, and the learning ends when a specified number of times is reached. The head rectangle estimation unit 21 estimates head rectangle coordinates and head reliability from an image by using the learned neural network thus obtained, and supplies those to the human body rectangle estimation unit 22 as the head rectangle information.

The human body rectangle estimation unit 22 generates human body rectangle information of a human body corresponding to the head based on the head rectangle information generated by the head rectangle estimation unit 21. First, the human body rectangle estimation unit 22 determines a human body candidate region corresponding to the head indicated by the head rectangle information. Here, the "human body candidate region" is a region in which a human body is considered to be present in the image. Generally, for the detected head, a human body of the same person often exists in the image. Also, due to physical characteristics of a human, a region of the human body can be estimated to some extent based on the position of the head. For instance, it has been obtained as prior knowledge that the body is often located below a neck with respect to the head.

Figure 5:
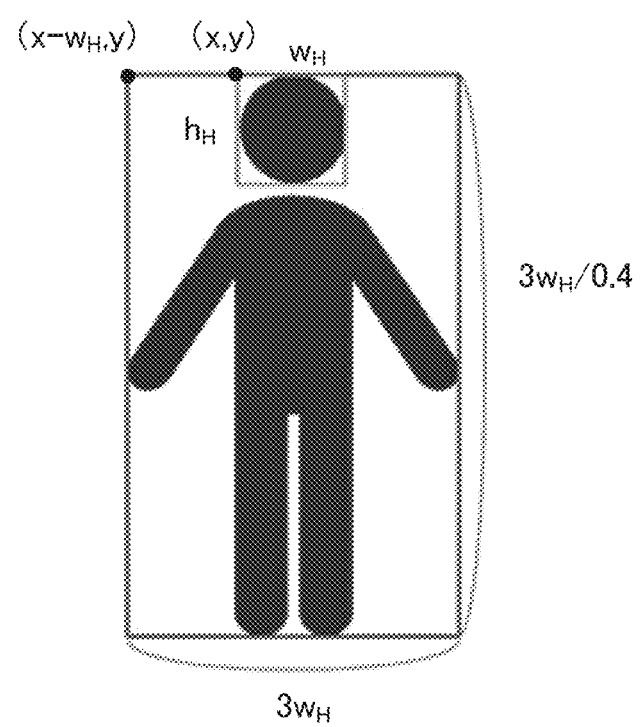
FIG. 5 illustrates an example of a determination method of a human candidate region.

FIG. 5 illustrates an example of a determination method of a human candidate region. In this example, a mechanical model is created based on prior knowledge that a human body is under a head and the human body is often a vertically long rectangle, and the human body candidate region is calculated from the head position. Specifically, in this example, a width of the human body is three times that of the head, and a height of the human body is two and half times the width of the human body. Assuming that head rectangle coordinates given from the head rectangle estimation unit 21 includes coordinates (x, y) of an upper left point of a head rectangle and a width and height ($w_H$, $h_H$) of the head rectangle, the human body rectangle estimation unit 22 determines the coordinates of the upper left point of a human body candidate region as (x−$w_H$, y) and the width and height as (3$w_H$, 3$w_H$/0.4).

Figure 6:
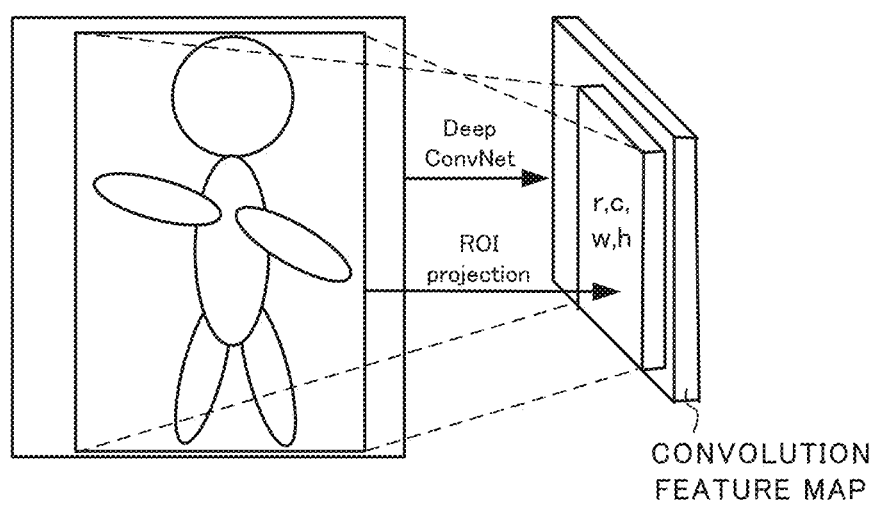
FIG. 6 illustrates a method for acquiring a feature amount of a human body candidate region.

Next, as depicted in FIG. 6, the human body rectangle estimation unit 22 cuts out a feature amount corresponding to the human body candidate region from a feature amount of the entire image obtained from image data, and obtains the feature amount of the human body candidate region. Next, the human body rectangle estimation unit 22 estimates the human body rectangle and the human body reliability from the feature amount of the obtained human body candidate region, and outputs those as the human body rectangle information.

A human body rectangle estimation process by the human body rectangle estimation unit 22 is not limited to a specific estimation process, and as with the head rectangle estimation unit 21, there are a matching method using a sliding window, a method using the machine learning such as deep learning or the like. Specifically, in the method using the machine learning, the human body rectangle estimation unit 22 inputs the extracted feature amount into a CNN (Convolutional Neural Network), and outputs the human body rectangle coordinates and the human body reliability. Similar to the head rectangle estimation part 21, this process is conducted by the neural network which learns regression of the human body candidate region and a category classification problem and which estimates the human body rectangle coordinates and the human body reliability using the learned neural network. Accordingly, a pair of a head and a human body is obtained by the first method and is output to the integration unit 40.

(2) Second Method

In the first method described above, the head rectangle estimation unit 21 estimates a head rectangle from image data, and the human body rectangle estimation unit 22 estimates a human body candidate region based on a position of the head rectangle. In contrast, in the second method, the head rectangle estimation unit 21 estimates a center position of a human body in addition to the head rectangle, and the human body rectangle estimation unit 22 estimates a human body candidate region using the position of the head rectangle and the center position of the human body.

Specifically, the head rectangle estimation unit 21 calculates an image feature amount from the image data, estimates head rectangle coordinates and head reliability, and also estimates the center position of the human body to which the head belongs. Here, for an estimation process of the head rectangle, the same method as the first method can be used. Also, the estimation of the center position of the human body becomes possible by giving the center position of the human body as correct answer data and by the neural network learning a regression problem. That is, information, in which a head rectangle and a human rectangle of the same person are paired, is given as correct answer data so as to learn the neural network. Next, the image data are input to the learned neural network, and the center position of the human body is estimated.

The human body rectangle estimation unit 22 receives the head rectangle coordinates, the head reliability, and the center position of the human body to which the head belongs from the head rectangle estimation unit 21, and estimates a human body candidate region in which the human body of a person having the head may exist. Specifically, assuming that the head rectangle coordinates output from the head rectangle estimation unit 21 include a width and a height $(w_H, h_H)$ of the head rectangle, the human rectangle estimation unit 22 estimates a rectangle, which has a width and a height $(3w_H, 3w_H/0.4)$ and is centered on a center position of the human body received from the head rectangle estimation unit 21, as a human body candidate region. After that, the human body rectangle estimation unit 22 outputs a feature amount of the human body candidate region by extracting the feature amount corresponding to the human body candidate region from a feature amount of the entire image obtained from the image data. Next, similarly to the first method, the human body rectangle estimation unit 22 estimates a human body rectangle based on the human body candidate region, and outputs human body rectangle coordinates and human body reliability as the human body rectangle information.

Note that the method of generating a pair of a head and a human body derived from the head is not limited to the above method, and other methods may be used.

(Generating of Pair of Head and Human Body)

Next, a method of generating a pair of a head and a human body derived from the human body by the human body rectangle estimation unit 31 and the head rectangle estimation unit 32 will be described. The human body rectangle estimation unit 31 estimates human body rectangle coordinates and human body reliability by calculating an image feature amount from image data, and outputs them as the human body rectangle information to the head rectangle estimation unit 32.

The head rectangle estimation unit 32 estimates a head candidate region from a human body rectangle based on a positional relationship between a human head and a human body, similarly to the first method described above in the method for generating a pair of a head and a human body derived from the head. Specifically, the head rectangle estimation unit 32 estimates a head candidate region regarded as a region where the head is considered to be present, based on the human body rectangle coordinates input from the human body rectangle estimation unit 31 and the positional relationship between the head and the human body illustrated in FIG. 5. Next, the head rectangle estimation unit 32 extracts a feature amount of the obtained head candidate region from a feature amount of the entire image obtained from the image data, and estimates head rectangle coordinates and head reliability. Similar to the human body rectangle estimation unit 22, the head rectangle estimation unit 32 can estimate the head rectangle coordinates and the head reliability by a matching method using a sliding window or a method using the machine learning such as deep learning.

Note that the method of generating a pair of a head and a human body derived from the human body is not limited to the above-described method, and another method may be used.

(Integration Process)

Next, the integration process performed by the integration unit 40 will be described in detail. The integration unit 40 eliminates duplicate pairs from a plurality of pairs of heads and human bodies input from the human body rectangle estimation unit 22 and the head rectangle estimation unit 32. Two examples of the integration process will be described below.

(1) First Example

In the first example of the integration process, the integration unit 40 determines whether or not the input pair of the head and the human body is derived from the human body, and retains the pair of the head and the human body derived from the human body. In addition, in a case where the input pair of the head and the human body is derived from the head, the integration unit 40 deletes the pair of the head and the human body when the pair of the head and the human represents the same person as the pair of the head and the human body derived from the human body, and retains the pair of the head and the human body representing another person.

Figure 7:
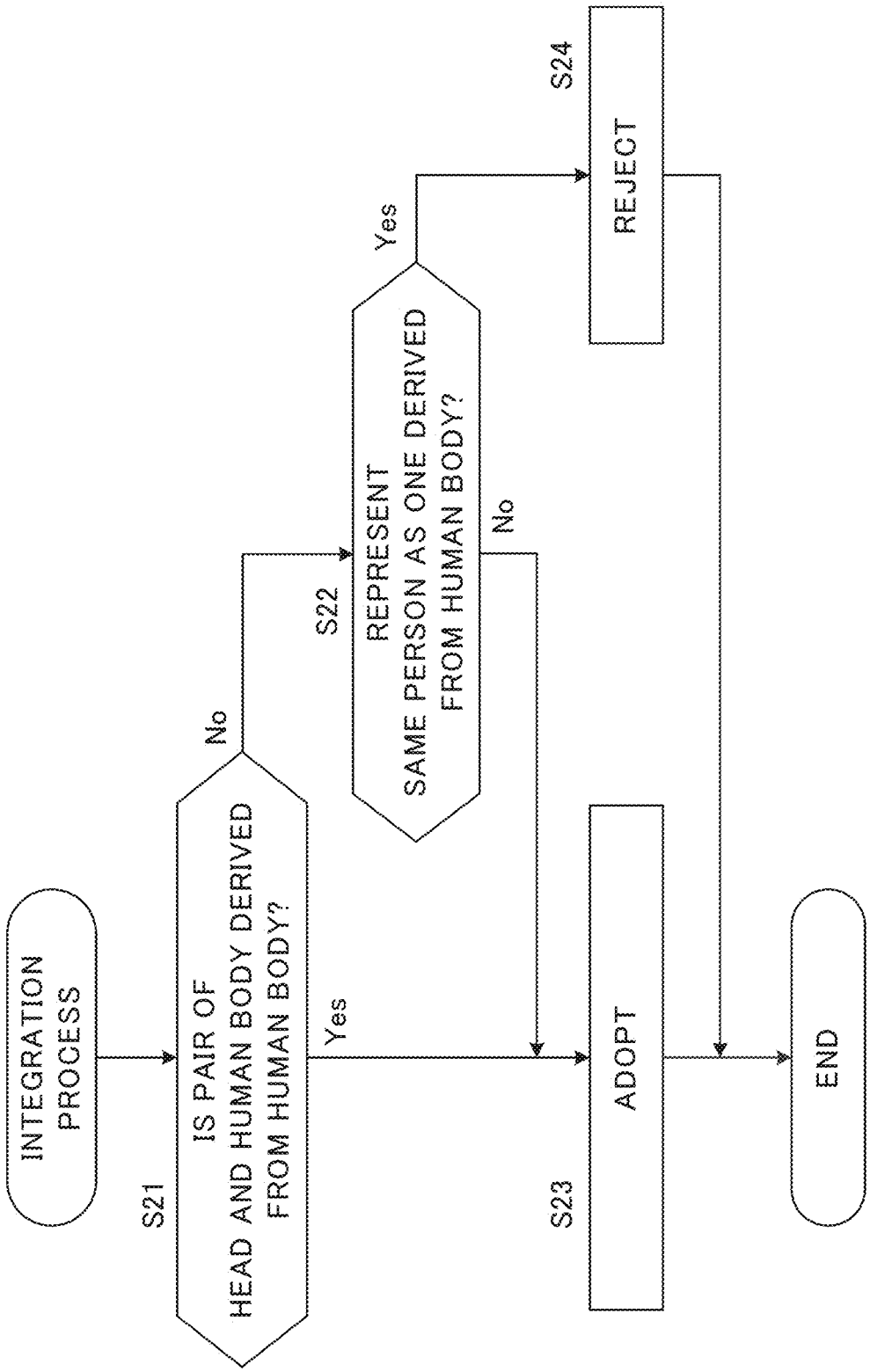
FIG. 7 is a flowchart for an integration process of a first example.

FIG. 7 is a flowchart of the integration process of the first example. This process is realized by the processor 13, which is illustrated in FIG. 2 and executes a program prepared in advance. First, the integration unit 40 acquires one from among the plurality of pairs of heads and human bodies as a pair of a head and a human body to be processed (hereinafter, also referred to as a "pair to be processed"), and determines whether or not the pair to be processed is derived from the human body (step S21). When the pair to be processed is derived from the human body (step S21: Yes), the integration unit 40 adopts the pair to be processed to retain (step S23).

On the other hand, when the pair to be processed is not derived from the human body (step S21: No), that is, when the pair to be processed is derived from the head, the integration unit 40 determines whether or not the pair to be processed represents the same person as another pair of a head and a human body derived from the human body (step S22). Specifically, the integration unit 40 compares the pair to be processed with all other pairs of heads and human bodies derived from human bodies, and determines whether the pair to be processed is the same person as either one of the other pairs of heads and human bodies. Hereinafter, a determination as to whether the same person is or not also referred to as the "same person determination".

When the pair to be processed represents the same person as either one of pairs of heads and human bodies derived from the human bodies (step S22: Yes), since the pair to be processed is considered to be duplicate with the one pair of a head and a human body, the integration unit 40 rejects the pair to be processed (step S24). On the other hand, when the pair to be processed is not the same person as any of pairs of heads and human bodies derived from the human bodies (step S22: No), since the pair to be processed is considered not to be duplicate, the integration unit 40 adopts the pair to be processed (step S23). By this process, the pair to be processed, which is not duplicate with another pair of a head and human body derived from the human bodies, is adopted.

The integration unit 40 sequentially executes the process described above for all of the input plurality of pairs of heads and human bodies, and outputs the pair of the head and the human body adopted in step S23 as an integration result. Hence, the integration unit 40 deletes a duplicate pair of a head and a human body. Furthermore, according to the first example, since all pairs of heads and human bodies derived from the human bodies are adopted, and a pair of a head and a human body derived from the head is adopted only when the pair is not duplicate with any pair of a head and a human body derived from the human body, it is possible to preferentially adopt pairs of heads and human bodies derived from the human bodies having a higher accuracy and to ensure accuracy of a human body detection.

A comparison in the same person determination in step S22 may be conducted to only between the head rectangles and to both between the head rectangles and between the human body rectangles. In a case of comparing only between the head rectangles, the integration unit 40 compares only between the head rectangles of a pair to be processed and pairs of heads and human bodies derived from a certain head, and determines whether or not the same person is indicated. On the other hand, in a case of comparisons both between the head rectangles and between the human body rectangles, the integration unit 40 compares the pair to be processed with the head rectangles and with the human body rectangles with respect to pairs of heads and human bodies derived from a certain human body, and determines whether or not the same person is indicated. By comparing both between the head rectangles and between the human body rectangles, it is possible to further improve the accuracy of the same person determination.

As a method of comparison in the same person determination in step S22, an overlap size between the rectangles may be used, and a closeness between center coordinates of the rectangles may be used. In this method, the same person determination becomes possible by a calculation of a simple region or a distance. For instance, in a case where the comparison is conduced only between the head rectangles and an overlap size between rectangles is used, when the overlap size between the pair to be processed and a head rectangle of pairs of heads and human bodies derived from a certain human body is equal to or greater than a predetermined threshold value, the integration unit 40 determines that the pair to be processed and the pair of a head and a human body derived from the human body represent the same person, and when the overlap size is less than the predetermined threshold value, the integration unit 40 determines that the pair to be processed and the pair of the head and the human body derived from the human body do not represent the same person. Also, in a case where the comparison is conducted between the head rectangles and between the human body rectangles and the overlap size between rectangles is used, when both an overlap of the head rectangles and an overlap of the human body rectangles are equal to or greater than a predetermined threshold value with respect to the pair to be processed and the pair of the head and the human body derived from the human body, the integration unit 40 determines that the pair to be processed and the pair of a head and a human body derived from the human body represent the same person, and in other cases, the integration unit 40 determines that the pair to be processed and the pair of the head and the human body derived from the human body do not present the same person.

On the other hand, in a case where a comparison is conducted only between head rectangles and a closeness between center coordinates of the rectangles is used, when a distance between center coordinates of a head rectangle of a pair to be processed and a head rectangle of a pair of a head and a human body derived from a certain human body is shorter than a predetermined threshold value, the integration unit 40 determines that the pair to be processed and the pair of the head and the human body derived from that human body represent the same person, and when the distance between the center coordinates are equal to or more than the predetermined threshold value, it determines that the pair to be processed and the pair of the head and the human body derived from the human body are not of the same person. Moreover, in a case where the comparison is conducted to both between head rectangles and between human body rectangles, and a closeness between center coordinates of the rectangles is used, when both a distance between center coordinates of a head rectangle of a pair to be processed and center coordinates of a head rectangle of a pair of a head and a human body derived from a certain human body and a distance between center coordinates of a human body rectangle of the pair to be processed and a human body rectangle of the pair of a head and a human body derived from the certain human body are shorter than the predetermined threshold value, the integration unit 40 determines that the pair to be processed and the pair of the head and the human body derived from that human body represent the same person; in other cases, the integration unit 40 determines that the pair to be processed and the pair of the head and the human body derived from that human body do not represent the same person.

(2) Second Example

In a second example of the integration process, in addition to the process of the first example, in a case where the pair to be processed is derived from a human body, the integration unit 40 further determines whether or not the pair to be processed is duplicate with another pair of a head and a human body derived from the human body, and adopts the pair only when the pair is not duplicate.

Figure 8:
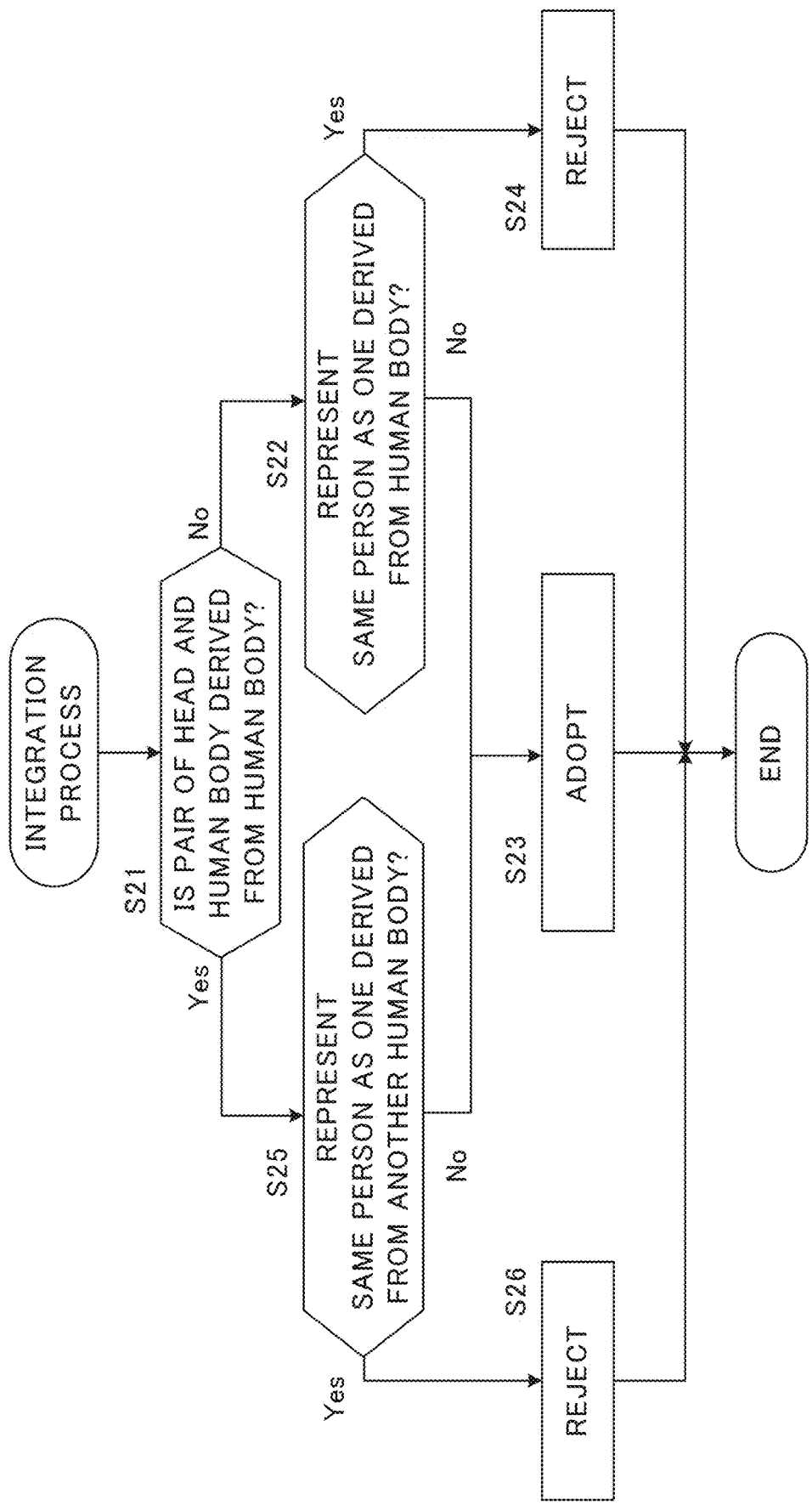
FIG. 8 is a flowchart for an integration process of a second example.

FIG. 8 is a flowchart for an integration process of the second example embodiment. This process is realized by the processor 13, which is illustrated in FIG. 2 and executes a program prepared in advance. First, the integration unit 40 acquires one from among a plurality of pairs of heads and human bodies as a pair to be processed and determines whether or not the pair to be processed originates from a human body (step S21). Steps S22 to S24 in a case where the pair to be processed does not originate from the human body are the same as those steps in the first example illustrated in FIG. 7, and thus explanations thereof will be omitted.

On the other hand, when the pair to be processed originates from the human body (step S21: Yes), the integration unit 40 determines whether or not the pair to be processed represents the same person as a pair of a head and a human body derived from another human body (step S25). In the same person determination in step S25, a comparison may be conducted only between head rectangles or both between head rectangles and between human body rectangles. Moreover, as a method of the comparison, an overlap size between rectangles may be used, or a closeness between the center coordinates of the rectangles may be used.

When the pair to be processed represents the same person as the pair of the head and the human body derived from another human body (step S25: Yes), the pair to be processed is considered to duplicate with the pair of the head and another human body which has been adopted, and the integration unit 40 thus rejects the pair to be processed (step S26). On the other hand, when the pair to be processed does not represent the same person as the pair of the head and the human body derived from another human body (step S25: No), the pair to be processed is not considered to duplicate with the pair of the head and the human body derived from another human body, and the integration unit 40 thus adopts the pair to be processed (step S23).

Also in the second example, the integration unit 40 sequentially performs the process described above for all of a plurality of input pairs of heads and human bodies, and outputs the pairs of heads and human bodies output in step S23 as an integration result. According to the second example, in addition to preferentially adopting a pair of a head and a human body derived from the human body over a pair of a head and a human body derived from the head, a duplicate pair is deleted from among pairs of heads and human bodies derived from the human bodies; accordingly, it is possible to further improve accuracy of the human body detection.

[Human Body Detection Process]

Figure 9:
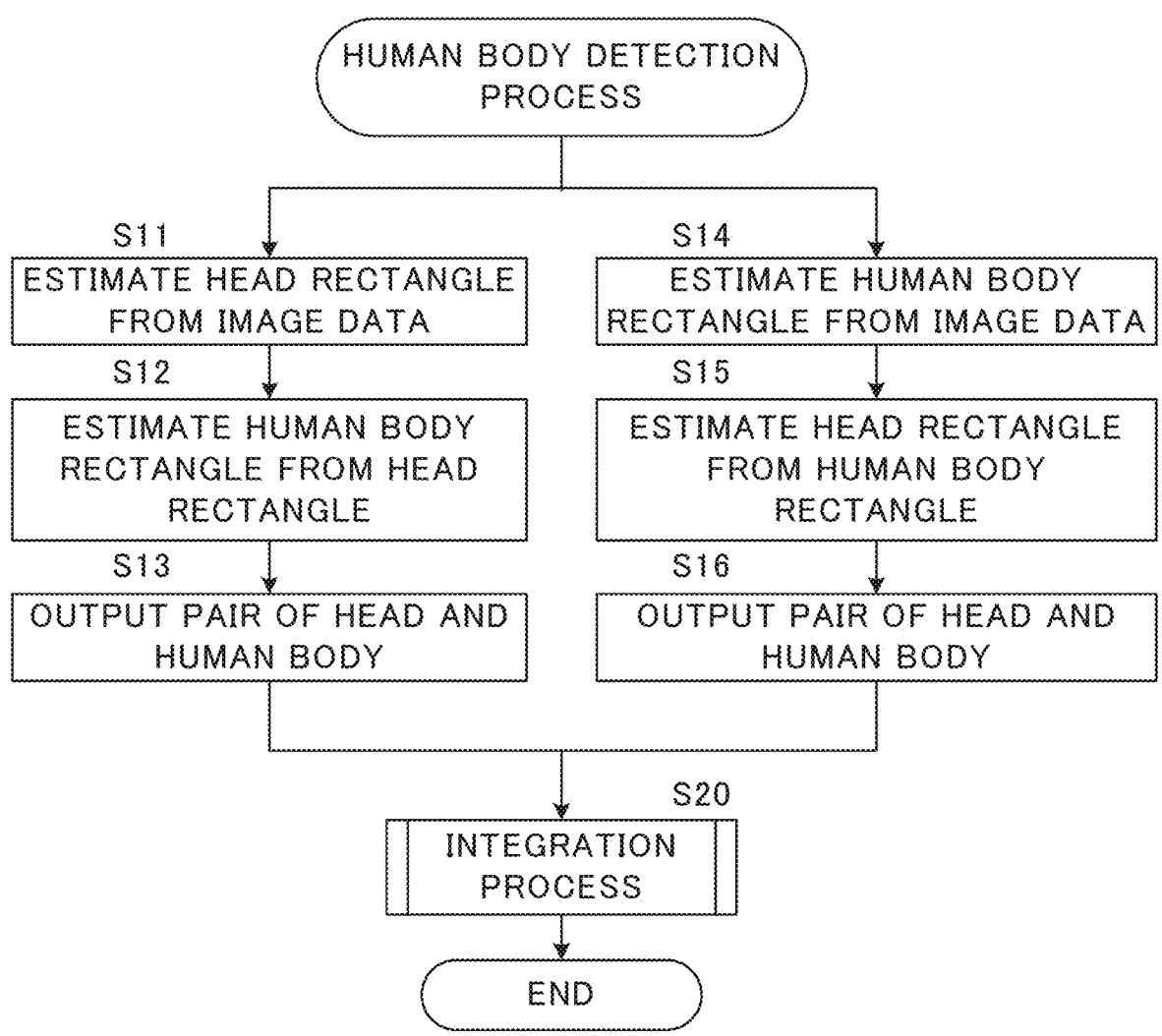
FIG. 9 is a flowchart for a human body detection process by the human body detection apparatus.

FIG. 9 is a flowchart of a human body detection process performed by the human body detection apparatus 100. This process is realized by the processor 13, which is illustrated in FIG. 2 and executes a program prepared in advance, and functions as each element shown in FIG. 3.

First, the head rectangle estimation unit 21 estimates a head rectangle from the image data and generates the head rectangle information (step S11). Next, the human body rectangle estimation unit 22 estimates a human body rectangle from the head rectangle based on the head rectangle information (step S12). Then, the human body rectangle estimation unit 22 outputs head rectangle information obtained in step S11 and human body rectangle information obtained in step S12 as a pair of a head and a human body to the integration unit 40 (step S13). Accordingly, a number of pairs of heads and human bodies derived from the heads, which can be estimated from the image data, are obtained.

Similarly, the human body rectangle estimation unit 31 estimates a human body rectangle from the image data and generates human body rectangle information (step S14). Next, the head rectangle estimation unit 32 estimates a head rectangle from a human body rectangle based on the human body rectangle information (step S15). Then, the head rectangle estimation unit 32 outputs the head rectangle information obtained in step S14 and the human body rectangle information obtained in step S15 to the integration unit 40 as a pair of a head and a human body (step S16). Accordingly, a number of pairs of heads and human bodies derived from the human bodies, which can be estimated from image data, are obtained. In addition, any of the steps S11 to S13 and the steps S14 to S16 may be performed first, and may be performed in parallel in time.

Next, the integration unit 40 performs an integration process using a plurality of head-human pairs input in steps S13 and S16 (step S20). The integration process may be the process of the first example described above or may be the process of the second example. Accordingly, the integration unit 40 outputs the pair of the head and the human body adopted in the integration process as a detection result of the human body.

[Modification]

In the above example, the head rectangle estimation unit 21 and the human body rectangle estimation unit 31 estimate a head and a human body, respectively, from image data using an object detection technique that utilizes an anchor box (referred to as an "anchor base"). Instead, an object detection technique not using an anchor (referred to as an "anchor-free base") may be used to detect a head or a human body.

FIG. 10 schematically illustrates a method for detecting a head rectangle and a human body rectangle by a detector using a CenterNet as an example of an object detection method of an anchor-free base. In the detector, image data are input into a convolutional network such as a CNN, and a heat map indicating a probability that an object is present is generated. The detector detects a peak position in the heat map as a center position (key point) of the object, and defines a rectangle of the object by a width and a height based on the center position.

Specifically, the head rectangle estimation unit 21 uses a learned network to detect each head center from the image data, generates a heat map M1 of a head center position, and outputs a head center position 51 and a width 52w and height 52h with reference to the head center position 51. By the head center position 51 and the width 52w and height 52h with reference to the head center position, the head rectangle 53 is defined. Incidentally, for convenience of explanation in FIG. 10, one person alone is present in the image data; however, the heat map M1 of head center positions, which is generated from the image data representing a plurality of persons, indicates the head center positions for the plurality of persons present in an image. Hence, the head rectangle estimation unit 21 creates the heat map M1 indicating the head center positions of the plurality of persons represented in the image data. The heat map of the head center positions generated by the head rectangle estimation unit 21 is called a "heat map of heads derived from the heads".

Similarly, the human body rectangle estimation unit 31 uses a learned network to detect the human body center from the image data, generates a heat map M2 for a human body center position, and outputs a human body center position 54, and a width 55w and height 55h based on the human body center position 54. A human body rectangle 56 is defined by a human body center position 53 and a width 55w and height 55h based on the human body center position. In FIG. 10, for convenience of explanation, one person alone is represented in the image data; however, the heat map M2 for human center positions, which is generated from the image data representing a plurality of persons, indicates the human center positions of the plurality of persons represented in the image. Hence, the human body rectangle estimation unit 31 creates the heat map M2 indicating the human center positions for a plurality of persons presented in the image data. The heat map for the human body center positions generated by the human body rectangle estimation unit 31 is called a "heat map for human bodies derived from the human bodies".

First, the human body rectangle estimation unit 22 estimates a human body center candidate region using a head center position 51 estimated by the head rectangle estimation unit 21 and an offset indicating a positional relationship between a head center position and the human body center position of the same person as illustrated in FIG. 5, for instance. Next, the human body rectangle estimation unit 22 estimates a human body center position corresponding to the head center position estimated by the head rectangle estimation unit 21, by using the estimated human body center candidate region and the heat map for the human body center positions generated from the image data. That is, the human body rectangle estimation unit 22 estimates the human body center position corresponding to the human body center candidate region based on the heat map including a plurality of human body center positions, as the human body center position corresponding to the head center position estimated by the head rectangle estimation unit 21, acquires a width and a height relative to the human body center position, and estimates the human body rectangle. By these processes, the human body rectangle estimation unit 22 creates the heat map indicating the human center positions for a plurality of persons represented in the image data. The heat map for the human body center positions generated by the human body rectangle estimation unit 22 is called a "heat map of human bodies derived from heads".

Similarly, the head rectangle estimation unit 32 first estimates a head center candidate region using the human center position 54 and the offset indicating the positional relationship between the human center position and the head center position of the same person. Next, the head rectangle estimation unit 32 estimates a head center position corresponding to the human body center position estimated by the human body rectangle estimation unit 31 using the estimated head center candidate region and the heat map for the head center positions generated from the image data. That is, the head rectangle estimation unit 32 estimates head center positions corresponding to the head center candidate regions based on the heat map including the plurality of head center positions as the head center positions corresponding to the human body center positions estimated by the human body rectangle estimation unit 31, acquires a width and a height relative to each head center position, and estimates a head rectangle for each head center position. Accordingly, the head rectangle estimation unit 32 creates a heat map indicating the head center positions for the plurality of persons represented in the image data. The heat map for the head center positions generated by the head rectangle estimation unit 32 is called a "heat map of heads derived from the human bodies".

Incidentally, the heat map for the head center positions is an example of a first heat map, and the heat map of the human center positions is an example of a second heat map.

The integration unit 40 performs an integration process using the heat maps thus obtained. According to this modification, in a case of performing the same person determination in the integration process, it is possible to determine a closeness between the center positions of the rectangles based on a distance between peak positions on the heat map. This determination can be performed by a logic operation or the like with respect to the two heat maps. For instance, in the first example of the integration process, a case will be considered in that the same person determination is performed in step S22 in FIG. 7. In a case of comparing heads to each other, the integrated portion 40 may compare the heat map of heads derived from the heads with the heat map of heads derived from the human bodies, and accept a pair of a head and a human body when a distance between center positions of heads is equal to or longer than a predetermined threshold value. Thus, according to the modification, compared with a case where the same person determination is performed by calculating all overlaps for a large number of rectangles, it is possible to significantly reduce an amount of calculation.

Display Example

Figure 11A:
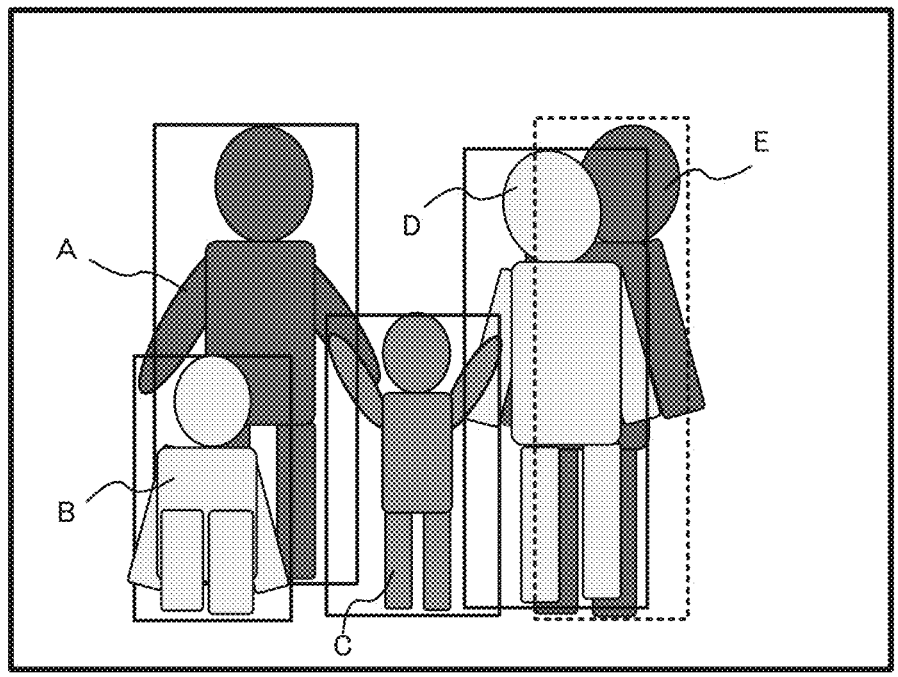
FIG. 11A and FIG. 11B illustrate examples of human body rectangles displayed on a display unit.
Figure 11B:
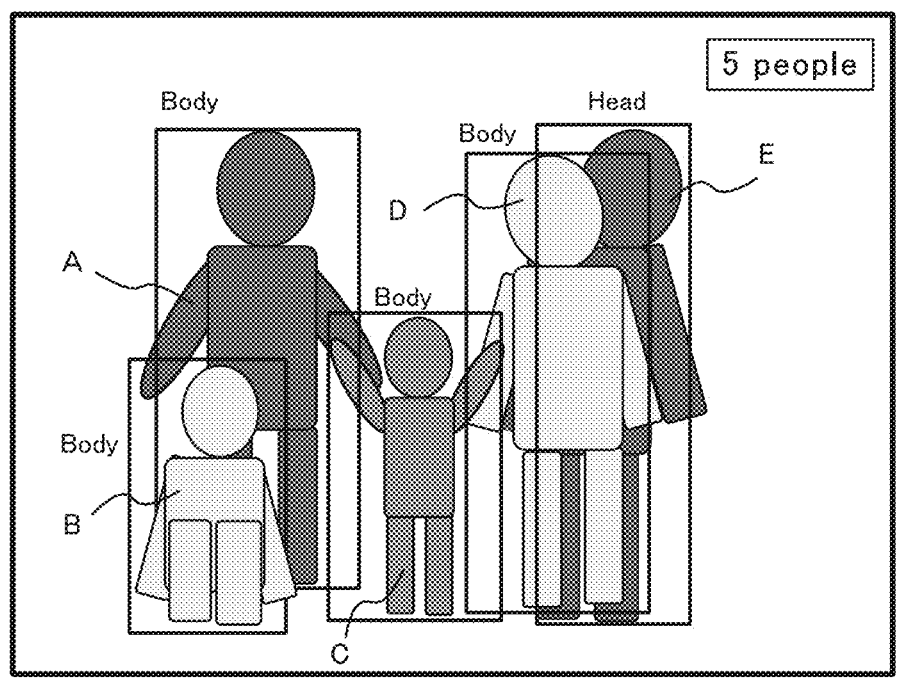

Next, a display example of the human body rectangle detected by the human body detection apparatus 100 will be described. FIG. 11A and FIG. 11B illustrate examples of human body rectangles displayed on the display unit 17. Incidentally, the examples in FIG. 11A and FIG. 11B illustrate human body rectangles, which the human body detection apparatus 100 detects, superimposes, and displays with respect to an image in which five persons A to E are captured.

As described above, the human body detection apparatus 100 can detect by distinguishing between a human body rectangle derived from a head and a human body rectangle derived from a human body. Accordingly, the display unit 17 displays the human body rectangle derived from the head and the human body rectangle derived from the human body in a distinguishable manner. Specifically, the human body rectangle derived from the head and the human body rectangle derived from the human body may be distinguishably displayed by a line color of the rectangle, a type of a line, a thickness of the line, a color imparted to an inside of the rectangle, or the like. In the example in FIG. 11A, the human body rectangle derived from the human body is displayed with a solid line, and the human body rectangle derived from the head is displayed with a broken line. The persons A to D are detected as human body rectangles derived from human bodies because the shielding is small, and the person E is detected as a human body rectangle derived from a head because the shielding is large.

In addition, characters or symbols indicating respective rectangles may be applied in order to distinguish the human body rectangle derived from the head and the human body rectangle derived from the human body. In FIG. 11B, the human body rectangle derived from the head is marked with letters "Head", and the human body rectangle derived from the human body is marked with letters "Body". Incidentally, as shown in FIG. 111B, the number of detected human body rectangles, that is, the number of people may be displayed.

As described above, since the human body detection device 100 of the present example embodiment distinguishably detects the human body derived from the head and the human body derived from the human body, it is possible to distinguishably display a person detected on the basis of a head and a person detected on the basis of a human body.

Application Example

Next, an application example of a detection result by the human body detection apparatus 100 will be described. A human body rectangle detected by the human body detection apparatus 100 can be used for matching and recognition of a person (hereinafter, collectively referred to as "recognition").

Figure 12A:
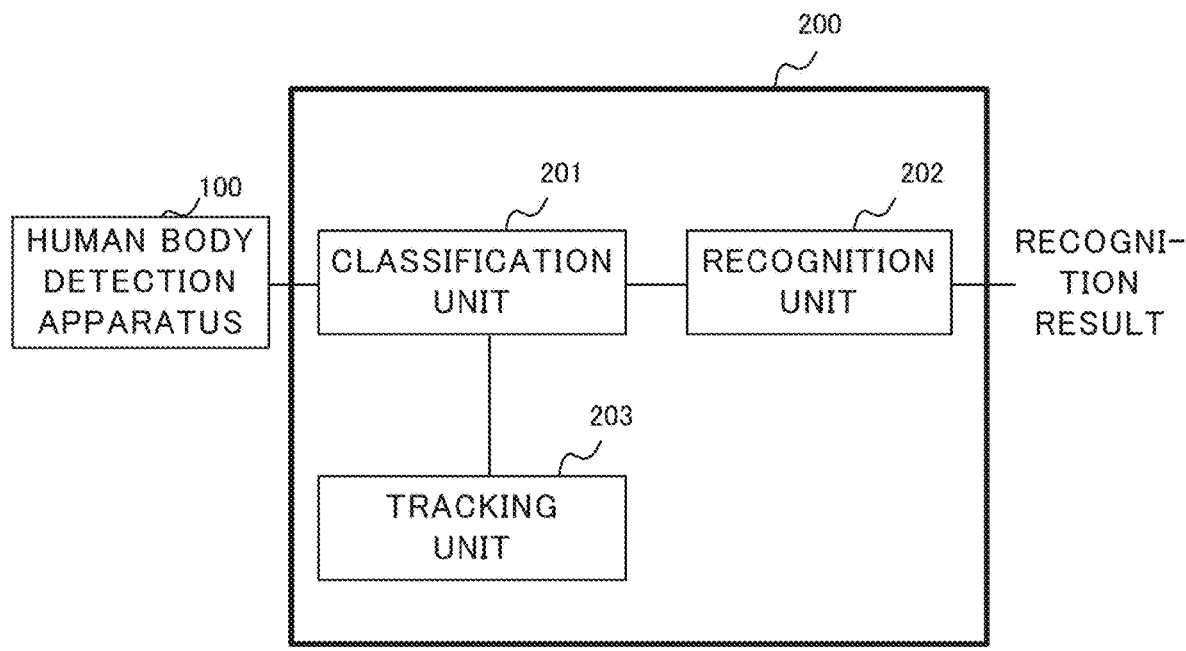
FIG. 12A and FIG. 12B illustrate examples of a recognition apparatus that performs a person recognition using a detection result of the human body detection apparatus.

FIG. 12A illustrates a configuration example of a recognition apparatus that performs person recognition based on a detection result of the human body detection apparatus 100. A recognition apparatus 200 includes a classification unit 201, a recognition unit 202, and a tracking unit 203.

The human body rectangle information, which the human body detection apparatus 100 outputs as a detection result, includes information indicating whether the human body rectangle is derived from a head or a human body (hereinafter, referred to as "origin information") in addition to the human body rectangle coordinates and the human body reliability. As described earlier, the human body rectangle information derived from a head is less accurate compared with the human body rectangle information derived from a human body, and is considered unsuitable for use in the person recognition. Hence, the classification unit 201 determines whether the input human body rectangle information is derived from a head or a human body based on the origin information, and outputs the human body rectangle information derived from the human body to the recognition unit 202. The recognition unit 202 performs the person recognition using the human body rectangle information derived from the human body, and outputs a recognition result. The person recognition here includes, for instance, a facial recognition, a systematic recognition, and a gait recognition.

On the other hand, the human body rectangle derived from the head is not suitable for use in the person recognition in terms of accuracy; however, the human body rectangle derived from the head can be used for tracking a person. Therefore, the classification unit 201 outputs the human body rectangle information derived from the head to the tracking unit 203. The tracking unit 203 performs a tracking process of the person based on the human body rectangle derived from the head input from the classification unit 201. The tracking unit 203 assigns a person ID or the like for tracking each person represented in an image and performs the tracking. The tracking unit 203 continues the tracking of each person using the human body rectangle derived from the head which is continuously input, and outputs a tracking result including the person ID or the like of each person to the classification unit 201.

The classification unit 201 monitors the human body rectangle derived from the head detected from each frame image as the human body rectangle of the same person based on the tracking result by the tracking unit 203, and outputs human body rectangle information to the recognition unit 202 when the human body rectangle derived from the human body is input for that person. By this process, by continuously tracking a person who has not been recognized because the human body rectangle derived from the head alone is detected during a certain term in a video, it is possible to verify the person when the human body rectangle derived from the human body is detected.

Figure 13A:
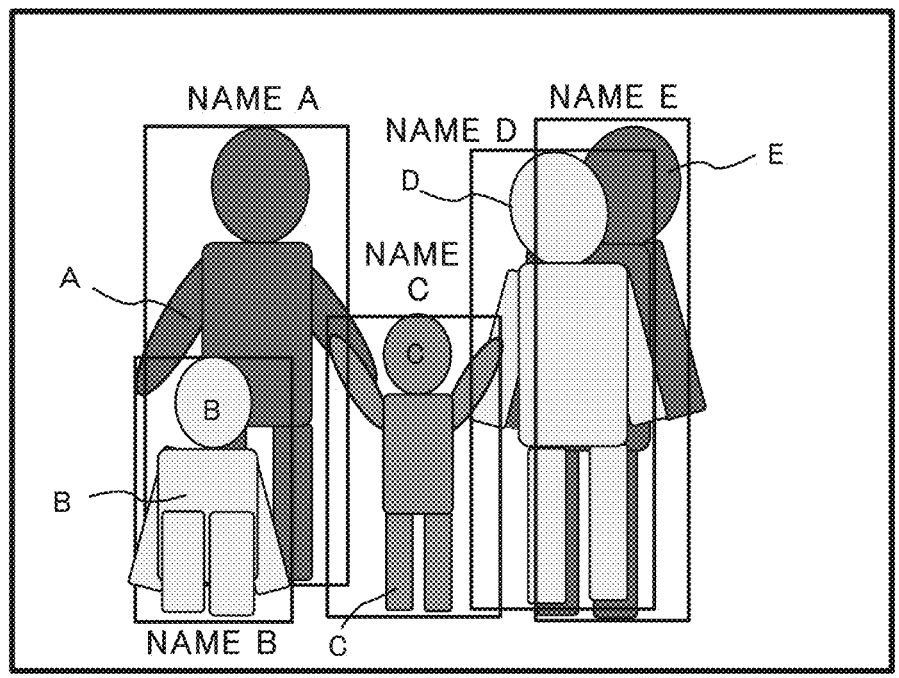

FIG. 13A illustrates a display example of the recognition result obtained by the recognition apparatus 200. Person names A to E, which are acquired by the person recognition, are applied to rectangles of respective persons. Since the recognition apparatus 200 performs the recognition based on the human body rectangle derived from the human body, FIG. 13A illustrates as rectangles of a solid line indicating that the rectangles of all persons are derived from the human body.

Figure 12B:
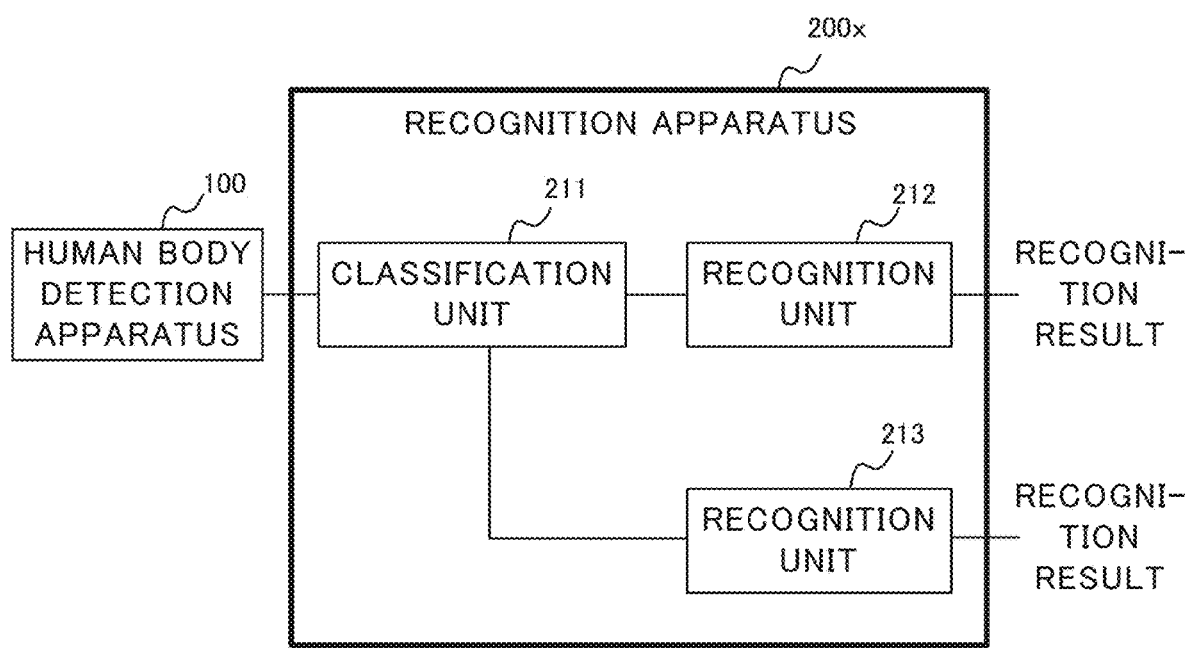

FIG. 12B illustrates a configuration example of another recognition apparatus that performs person recognition based on the detection result of the human body detection apparatus 100. The recognition apparatus 200x includes a classification unit 211 and recognition units 212 and 213.

The recognition apparatus 200x performs recognition for a human body rectangle derived from a head and a human body rectangle derived from a human body. However, since the human body rectangle derived from the head is less accurate than the human rectangle derived from the human body, it is not appropriate to use the same method as a case of the human rectangle derived from the human body. Accordingly, in the recognition apparatus 200x, the recognition unit 212 that performs recognition using the human body rectangle derived from the human body and the recognition unit 213 that performs recognition using the human body derived from the head are separately prepared. The recognition units 212 and 213 are formed by, for instance, a neural network or the like. The recognition unit 212 may be formed by a neural network, which has been learned and uses human body rectangles derived from human bodies as learning data and the recognition unit 213 may be formed by a learned neural network using human body rectangles derived from heads as learning data. Therefore, even in a case where a human body rectangle derived from a head is input, it is possible for the recognition unit 213 to perform the recognition with a constant accuracy.

The classification unit 211 classifies human body rectangle information input from the human body detection apparatus 100 based on the origin information, outputs the human body rectangle derived from the human body to the recognition unit 212, and outputs the human body rectangle derived from the head to the recognition unit 213. The recognition unit 212 performs the recognition based on the human body rectangle derived from the human body, and outputs the recognition result. Also, the recognition unit 213 performs the recognition based on the human body rectangle derived from the head, and outputs the recognition result.

Figure 13B:
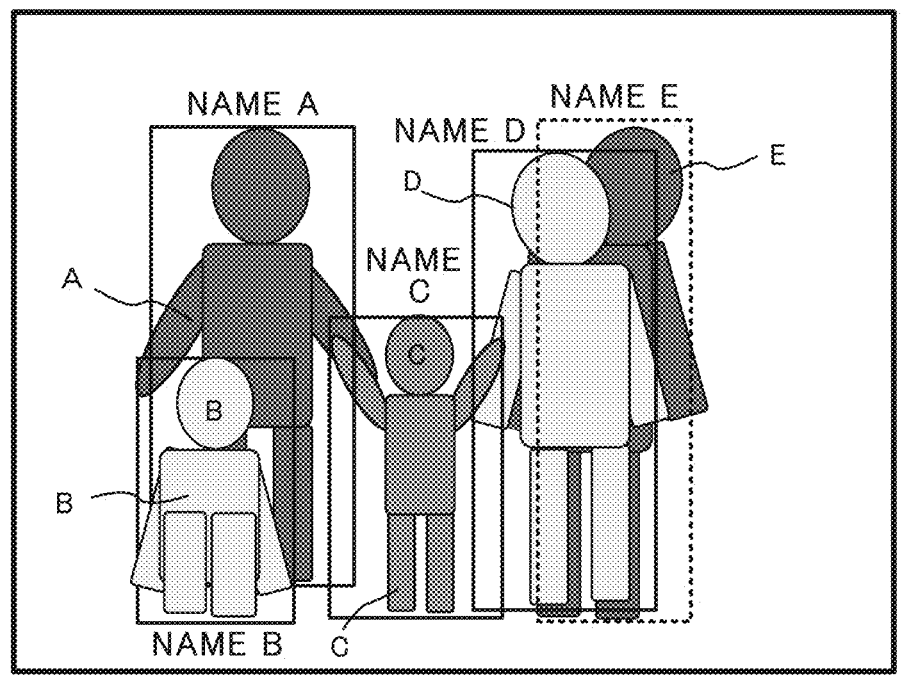

FIG. 13B illustrates a display example of the recognition result obtained by the recognition apparatus 200x. Person names A to E, which are acquired by the person recognition, are applied to rectangles of respective persons. In FIG. 13B, the rectangles for people A to D recognized by using the human body rectangle derived from the human body are depicted by a solid line indicating that the human body is derived, and the rectangle of the person E recognized by using the human body rectangle derived from the head are depicted by a broken line indicating that the human body is derived from the head.

Second Example Embodiment

FIG. 14 is a block diagram illustrating a functional configuration of a human body detection apparatus according to a second example embodiment. A human body detection apparatus 70 includes a first portion rectangle estimation section 71, a first human body rectangle estimation section 72, a second human body rectangle estimation section 73, a second portion rectangle estimation section 74, and a human body integration section 75.

Figure 15:
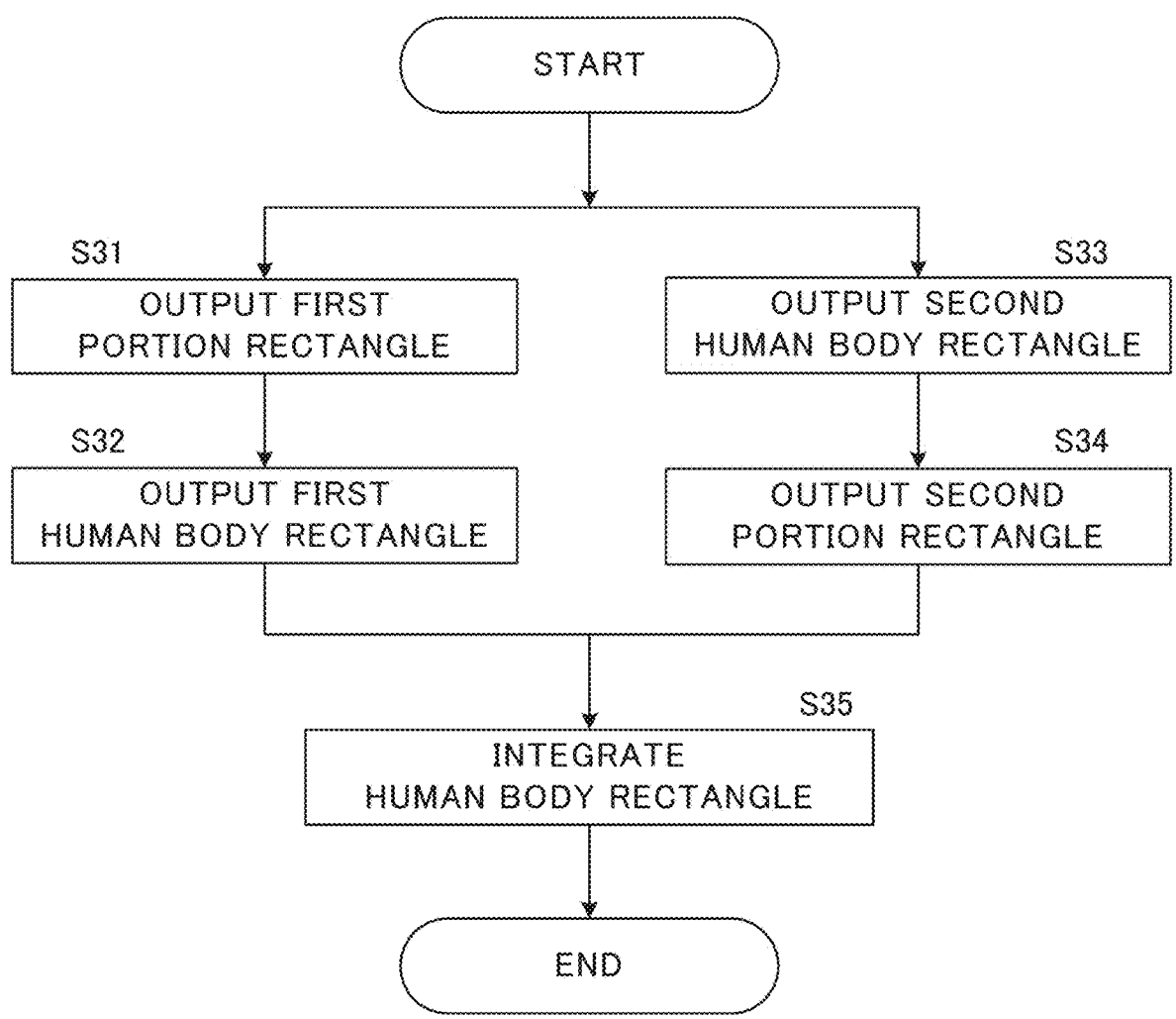
FIG. 15 is a flowchart of a process by the human body detection apparatus of the second example embodiment.

FIG. 15 is a flowchart of a process performed by the human body detection apparatus 70 according to the second example embodiment. The first portion rectangle estimation unit 71 estimates a specific portion of a human body from an image and outputs a first portion rectangle including the specific portion (step S31). The first human body rectangle estimation unit 72 estimates the human body corresponding to the specific portion included in the first portion rectangle based on coordinates of the first portion rectangle, and outputs a first human body rectangle including the human body (step S32). The second human body rectangle estimation section 73 estimates the human body from the image and outputs a second human body rectangle including the human body (step S33). The second portion rectangle estimation section 74 estimates a specific portion corresponding to a human body included in the second human body rectangle based on the coordinates of the second human body rectangle, and outputs a second portion rectangle including the specific portion (step S34). The human body integration section 75 integrates duplicate human body rectangles based on at least a relationship between the portion rectangles with respect to a plurality of pairs of mutually corresponding portion rectangles and human body rectangles (step S35).

According to the human body detection apparatus 70 of the second example embodiment, it is possible to provide a human body detection apparatus that is robust against shielding.

A part or all of the example embodiments described above may also be described as the following supplementary notes, but not limited thereto.

(Supplementary Note 1)

An information processing apparatus comprising:
  a portion rectangle estimation unit configured to estimate a specific portion of a human body from an image, and output a first portion rectangle including the specific portion;
  a first human body rectangle estimation unit configured to estimate a human body corresponding to the specific portion included in the first portion rectangle based on coordinates of the first portion rectangle, and output a first human body rectangle including the human body;
  a second human body rectangle estimation unit configured to estimate the human body from the image, and output a second human body rectangle including the human body;
  a second portion rectangle estimation unit configured to estimate the specific portion corresponding to the human body included in the second human body rectangle based on coordinates of the second human body rectangle, and output a second portion rectangle including the specific portion; and
  a human body integration unit configured to integrate duplicate human rectangles based on at least a relationship between the portion rectangles with respect to a plurality of pairs of mutually corresponding portion rectangles and human body rectangles.

(Supplementary Note 2)

The information processing apparatus according to supplementary note 1, wherein
  the first portion rectangle estimation unit is configured to output coordinates and reliability of the first portion rectangle,
  the first human body rectangle estimation unit is configured to output coordinates and reliability of the first human body rectangle,
  the second human body rectangle estimation unit is configured to output coordinates and reliability of the second human body rectangle, and
  the second portion rectangle estimation unit is configured to output coordinates and reliability of the second portion rectangle.

(Supplementary Note 3)

The information processing apparatus according to supplementary note 1 or 2, wherein the human body integration unit is configured to integrate duplicate human body rectangles based on an overlap rate of the portion rectangles.

(Supplementary Note 4)

The information processing apparatus according to supplementary note 1 or 2, wherein the human body integration unit is configured to integrate duplicate human body rectangles based on a distance between center positions of the portion rectangles.

(Supplementary Note 5)

The information processing apparatus according to supplementary note 1 or 2, wherein the human body integration unit is configured to integrate duplicate human body rectangles based on a relationship between the portion rectangles and a relationship between the human body rectangles with respect to the plurality of pairs.

(Supplementary Note 6)

The information processing apparatus according to supplementary note 5, wherein the human body integration unit is configured to integrate duplicate human body rectangles based on an overlap rate of the portion rectangles and an overlap rate of the human body rectangles.

(Supplementary Note 7)

The information processing apparatus according to supplementary note 5, wherein the human body integration unit is configured to integrate duplicate human body rectangles based on a distance between center positions of the portion rectangles and a distance between center positions of the human body rectangles.

(Supplementary Note 8)

The information processing apparatus according to any one of supplementary notes 1 through 7, wherein the human body integration unit is configured to reject the first human body rectangle and adopt the second human body rectangle, when the first human body rectangle and the second human body rectangle are duplicate.

(Supplementary Note 9)

The information processing apparatus according to supplementary note 8, wherein the human body integration unit is configured to reject a second human rectangle having a lower reliability and adopt a second human rectangle having higher reliability, when the second human rectangles are duplicate.

(Supplementary Note 10)

The information processing apparatus according to supplementary note 1, wherein
  the first portion rectangle estimation unit configured to output coordinates of a center position of the first position rectangle on a first heat map indicating a probability that the specific portion of the human body is present in the image,
  the first human body rectangle estimation unit configured to output coordinates of a center position of the second human body rectangle on a second heat map indicating a probability that the human body is present in the image,
  the second human body rectangle estimation unit configured to output coordinates of a center position of the second human body rectangle on the second heat map,
  the second portion rectangle estimation unit configured to output coordinates of a center position of the second position rectangle on the first heat map, and
  the human body integration unit is configured to determine a relationship between the portion rectangles using the first heat map.

(Supplementary Note 11)

The information processing apparatus according to supplementary note 4, wherein the first portion rectangle estimation unit is configured to output coordinates of a center position of the first portion rectangle on a first heat map indicating a probability that the specific portion of the human body is present in the image;

the first human body rectangle estimation unit is configured to output coordinates of a center position of the second human body rectangle on a second heat map indicating a probability that the human body is present in the image;

the second human body rectangle estimation unit is configured to output coordinates of a center position of the second human body rectangle on the second heat map;

the second portion rectangle estimation unit is configured to output coordinates of a center position of the second portion rectangle on the first heat map; and the human body integration unit is configured to determine a relationship between the portion rectangles using the first heat map and determine a relationship between the human body rectangles using the second heat map.

(Supplementary Note 12)

The information processing apparatus according to any one of supplementary notes 1 through 11, further comprising a display unit configured to display, in a distinguishable manner, the first human body rectangle and the second human body rectangle, which are adopted by the human body integration unit, by superimposing with the image.

(Supplementary Note 13)

An information processing method comprising:

estimating a specific portion of a human body from an image, and outputting a first portion rectangle including the specific portion;

estimating the human body corresponding to the specific portion included in the first portion rectangle based on coordinates of the first portion rectangle, and outputting a first human body rectangle including the human body;

estimating the human body from the image, and outputting a second human body rectangle including the human body;

estimating the specific portion corresponding to the human body included in the second human body rectangle based on coordinates of the second human body rectangle, and outputting a second portion rectangle including the specific portion; and integrating duplicate human rectangles based on at least a relationship between the portion rectangles with respect to a plurality of pairs of mutually corresponding portion rectangles and human body rectangles.

(Supplementary Note 14)

A recording medium storing a program, the program causing a computer to perform a process comprising:

estimating a specific portion of a human body from an image, and outputting a first portion rectangle including the specific portion;

estimating a human body corresponding to the specific portion included in the first portion rectangle based on coordinates of the first portion rectangle, and outputting a first human body rectangle including the human body;

estimating the human body from the image, and outputting a second human body rectangle including the human body;

estimating the specific portion corresponding to the human body included in the second human body rectangle based on coordinates of the second human body rectangle, and outputting a second portion rectangle including the specific portion; and integrating duplicate human rectangles based on at least a relationship between the portion rectangles with respect to a plurality of pairs of mutually corresponding portion rectangles and human body rectangles.

While the disclosure has been described with reference to the example embodiments and examples, the disclosure is not limited to the above example embodiments and examples. Various changes that can be understood by those skilled in the art can be made within the scope of this disclosure in the structure and details of this disclosure.

DESCRIPTION OF SYMBOLS

13 Processor
21, 32 Head rectangle estimation unit
40 Integration unit
100 Human body detection apparatus
200, 200x Recognition apparatus
201, 211 Classification unit
202, 212, 213 Recognition unit
203 Recognition unit

What is claimed is:

1. An information processing apparatus comprising:
a memory storing instructions; and
one or more processors configured to execute the instructions to:
estimate a specific portion of a human body from an image, and output a first portion rectangle including the specific portion;
estimate a human body corresponding to the specific portion included in the first portion rectangle based on coordinates of the first portion rectangle, and output a first human body rectangle including the human body;
estimate the human body from the image, and output a second human body rectangle including the human body;
estimate the specific portion corresponding to the human body included in the second human body rectangle based on coordinates of the second human body rectangle, and output a second portion rectangle including the specific portion; and
integrate duplicate human rectangles based on at least a relationship between the portion rectangles with respect to a plurality of pairs of mutually corresponding portion rectangles and human body rectangles.

2. The information processing apparatus according to claim 1, wherein
the processor is configured to output coordinates and reliability of the first portion rectangle,
the processor is configured to output coordinates and reliability of the first human body rectangle,
the processor is configured to output coordinates and reliability of the second human body rectangle, and
the processor is configured to output coordinates and reliability of the second portion rectangle.

3. The information processing apparatus according to claim 1, wherein the processor is configured to integrate duplicate human body rectangles based on an overlap rate of the portion rectangles.

4. The information processing apparatus according to claim 1, wherein the processor is configured to integrate duplicate human body rectangles based on a distance between center positions of the portion rectangles.

5. The information processing apparatus according to claim 4, wherein
- the processor is configured to output coordinates of a center position of the first portion rectangle on a first heat map indicating a probability that the specific portion of the human body is present in the image;
- the processor is configured to output coordinates of a center position of the second human body rectangle on a second heat map indicating a probability that the human body is present in the image;
- the processor is configured to output coordinates of a center position of the second human body rectangle on the second heat map;
- the processor is configured to output coordinates of a center position of the second portion rectangle on the first heat map; and
- the processor is configured to determine a relationship between the portion rectangles using the first heat map and determine a relationship between the human body rectangles using the second heat map.

6. The information processing apparatus according to claim 1, wherein the processor is configured to integrate duplicate human body rectangles based on a relationship between the portion rectangles and a relationship between the human body rectangles with respect to the plurality of pairs.

7. The information processing apparatus according to claim 6, wherein the processor is configured to integrate duplicate human body rectangles based on an overlap rate of the portion rectangles and an overlap rate of the human body rectangles.

8. The information processing apparatus according to claim 6, wherein the processor is configured to integrate duplicate human body rectangles based on a distance between center positions of the portion rectangles and a distance between center positions of the human body rectangles.

9. The information processing apparatus according to claim 1, wherein the processor is configured to reject the first human body rectangle and adopt the second human body rectangle, when the first human body rectangle and the second human body rectangle are duplicate.

10. The information processing apparatus according to claim 9, wherein the processor is configured to reject a second human rectangle having a lower reliability and adopt a second human rectangle having higher reliability, when the second human rectangles are duplicate.

11. The information processing apparatus according to claim 1, wherein
- the processor is configured to output coordinates of a center position of the first position rectangle on a first heat map indicating a probability that the specific portion of the human body is present in the image,
- the processor is configured to output coordinates of a center position of the second human body rectangle on a second heat map indicating a probability that the human body is present in the image,
- the processor is configured to output coordinates of a center position of the second human body rectangle on the second heat map;
- the processor is configured to coordinates of a center position of the second position rectangle on the first heat map, and
- the processor is is configured to determine a relationship between the portion rectangles using the first heat map.

12. The information processing apparatus according to claim 1, wherein the processor is further configured to display, in a distinguishable manner, the first human body rectangle and the second human body rectangle, which are adopted.

13. An information processing method comprising:
- estimating a specific portion of a human body from an image, and outputting a first portion rectangle including the specific portion;
- estimating the human body corresponding to the specific portion included in the first portion rectangle based on coordinates of the first portion rectangle, and outputting a first human body rectangle including the human body;
- estimating the human body from the image, and outputting a second human body rectangle including the human body;
- estimating the specific portion corresponding to the human body included in the second human body rectangle based on coordinates of the second human body rectangle, and outputting a second portion rectangle including the specific portion; and
- integrating duplicate human rectangles based on at least a relationship between the portion rectangles with respect to a plurality of pairs of mutually corresponding portion rectangles and human body rectangles.

14. A non-transitory computer-readable recording medium storing a program, the program causing a computer to perform a process comprising:
- estimating a specific portion of a human body from an image, and outputting a first portion rectangle including the specific portion;
- estimating a human body corresponding to the specific portion included in the first portion rectangle based on coordinates of the first portion rectangle, and outputting a first human body rectangle including the human body;
- estimating the human body from the image, and outputting a second human body rectangle including the human body;
- estimating the specific portion corresponding to the human body included in the second human body rectangle based on coordinates of the second human body rectangle, and outputting a second portion rectangle including the specific portion; and
- integrating duplicate human rectangles based on at least a relationship between the portion rectangles with respect to a plurality of pairs of mutually corresponding portion rectangles and human body rectangles.

* * * * *